US010343463B2

(12) United States Patent
Iwatani et al.

(10) Patent No.: US 10,343,463 B2
(45) Date of Patent: Jul. 9, 2019

(54) PNEUMATIC TIRE (71) Applicant: BRIDGESTONE CORPORATION, Tokyo (JP)

(72) Inventors: Takeshi Iwatani, Kodaira (JP); Kento Hashimoto, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 695 days.

(21) Appl. No.: 14/903,649

(22) PCT Filed: Jun. 16, 2014

(86) PCT No.: PCT/JP2014/003198
§ 371 (c)(1),
(2) Date: Jan. 8, 2016

(87) PCT Pub. No.: WO2015/004850
PCT Pub. Date: Jan. 15, 2015

(65) Prior Publication Data
US 2016/0144667 A1    May 26, 2016

(30) Foreign Application Priority Data
Jul. 12, 2013    (JP) .................... 2013-146665

(51) Int. Cl.
B60C 11/00    (2006.01)
B60C 11/03    (2006.01)
(Continued)

(52) U.S. Cl.
CPC ........ B60C 11/0332 (2013.01); B60C 11/005 (2013.01); B60C 11/0008 (2013.01);
(Continued)

(58) Field of Classification Search
CPC ............... B60C 11/005; B60C 11/0058; B60C 11/0066; B60C 11/0075
(Continued)

(56) References Cited

U.S. PATENT DOCUMENTS 5,351,734 A * 10/1994 Mouri ................... B60C 1/0016
152/209.4
5,370,167 A * 12/1994 Kogure ..................... B60C 9/18
152/209.18
(Continued)

FOREIGN PATENT DOCUMENTS

CN    101528484 A    9/2009
JP    11-115419 A    4/1999
(Continued)

OTHER PUBLICATIONS

English machine translation of JP2007-191020. (Year: 2007).*
English machine translation of JP2009-035130. (Year: 2009).*
International Search Report of PCT/JP2014/003198 dated Aug. 12, 2014.
Office Action of Japanese Application JP2013-146665 dated Nov. 10, 2015.

Primary Examiner — Robert C Dye
(74) Attorney, Agent, or Firm — Sughrue Mion, PLLC (57) ABSTRACT A pneumatic tire, having in a ground contact surface of a tread a plurality of main grooves extending in the tread circumferential direction and a plurality of land portions demarcated by the main grooves and tread ends, wherein, provided that two land portions adjacent to the central land portion on the respective sides in the tread width direction of the central land portion each represent an adjacent land portion, rigidity in the tread circumferential direction of the central land portion is lower than rigidity in the tread circumferential direction of the adjacent land portion.

9 Claims, 4 Drawing Sheets (51) Int. Cl.
*B60C 11/04* (2006.01)
*B29D 30/06* (2006.01)
*B60C 11/11* (2006.01)
*B60C 11/14* (2006.01)

(52) U.S. Cl.
CPC .......... *B60C 11/0306* (2013.01); *B60C 11/04* (2013.01); *B29D 2030/0617* (2013.01); *B60C 11/11* (2013.01); *B60C 2011/0016* (2013.01); *B60C 2011/0025* (2013.01); *B60C 2011/0334* (2013.01); *B60C 2011/0344* (2013.01); *B60C 2011/0358* (2013.01); *B60C 2011/147* (2013.01)

(58) Field of Classification Search
USPC ...................................................... 152/209.7
See application file for complete search history.

(56) References Cited

U.S. PATENT DOCUMENTS 5,711,828 A * 1/1998 Himuro ............... B60C 11/0306
152/209.18
2013/0153100 A1 6/2013 Piffard et al.

FOREIGN PATENT DOCUMENTS

| JP | 2001-71708 A | | 3/2001 |
|---|---|---|---|
| JP | 2002-192914 A | | 7/2002 |
| JP | 2007-191020 A | | 8/2007 |
| JP | 2009-035130 | * | 2/2009 |
| JP | 2009-255867 A | | 11/2009 |
| JP | 2012-46018 A | | 3/2012 |

* cited by examiner

CONVENTIONAL TIRE

PNEUMATIC TIRE

CROSS REFERENCE TO RELATED APPLICATIONS

This application is a National Stage of International Application No. PCT/JP2014/003198 filed Jun. 16, 2014 claiming priority based on Japanese Patent Application No. 2013-146665, filed Jul. 12, 2013, the contents of which are incorporated herein by reference in their entirety.

TECHNICAL FIELD

The present invention relates to a pneumatic tire.

BACKGROUND ART

There has been conventionally known, in a pneumatic tire for an icy/snowy road, a structure having: a plurality of blocks demarcated in a ground contact surface of a tread by main grooves extending in the tread circumferential direction and lateral grooves extending in the tread width direction; and a plurality of sipes formed in the blocks to extend in the tread width direction. Further, in a pneumatic tire for an icy/snowy road, there has been known as a structure of tread rubber what is called "cap-and-base" structure including a base rubber of high hardness and a cap rubber of low hardness provided on the outer side in the tire radial direction of the base rubber in a stacked manner.

According to the structures described above, it is possible to achieve good on-snow performance by ensuring a satisfactorily large groove area by the main grooves and the lateral grooves, as well as good-on ice performance by an edge effect caused by the sipes and a good ground contacting effect caused by the ground contact surface of the tread made of the cap rubber having low hardness.

In this regard, there has been proposed, as a technique of further improving gripping performance of the tire on an icy/snowy road surface, a technique of increasing ground contact pressure at a center portion of the tread by decreasing a radius of curvature of a crown portion of the tire (refer to PTL 1 and PTL 2, for example).

CITATION LIST

Patent Literature

PTL 1: JP-A 2002-192914
PTL 2: JP-A 11-115419

SUMMARY

However, in a case where ground contact pressure at the center portion of the tread is increased by the aforementioned technique, there arises a problem in that wear energy increases at the center portion too much to increase an amount of wear there, i.e. cause partial wear of the center portion. This problem can occur in a tire having a rib pattern, as well as a tire having a block pattern.

The present disclosure aims at solving the problem described above and an object thereof is to provide a pneumatic tire (having high ground contact pressure at the center portion of a tread thereof) capable of suppressing partial wear.

The inventors of our tire keenly studied to solve the aforementioned problem and made the following discoveries. A method for manufacturing a pneumatic tire generally includes a process of placing a green tire in a vulcanization mold and subjecting the green tire to vulcanization molding. The vulcanization mold is provided with vent holes for discharging air remaining between the green tire and the vulcanization mold. The vent holes are generally formed at positions corresponding to the four corners of each block of the tire, of the vulcanization mold, because air tends to remain between the green tire and the vulcanization mold at these positions. In this regard, in a tire having what is called a cap-and-base structure, base rubber having high hardness swells in a protruding shape toward the outer side in the tire radial direction because tread rubber (cap rubber) flows into the vent holes of the vulcanization mold in the vulcanization molding process. The inventors of our tire paid attention in this connection to a fact that the swollen or protruding portion of the base rubber increases rigidity in vicinities of the positions corresponding to the four corners of each block of the tire (the vent holes are formed at the positions), which increase in rigidity at least partly contributes to an increase in wear energy at the center portion of a tread. On this basis, the inventors discovered that it is possible to suppress partial wear by setting rigidity of land portions at the center portion of the tread to be lower than rigidity of land portions located on the outer side in the tire width direction thereof. Specifically, the inventors discovered that it is possible to effectively suppress partial wear by setting rigidity of land portions at the center portion of the tread to be lower than rigidity of land portions located on the outer side in the tire width direction thereof by appropriating positioning the vent holes.

Our tire has been contrived based on the discoveries described above and the primary structures thereof are as follows. Our pneumatic tire, having in a ground contact surface of a tread a plurality of main grooves extending in the tread circumferential direction and a plurality of land portions demarcated by the main grooves and tread ends, wherein:

provided that i) when the ground contact surface of the tread has a central main groove extending on the tire equatorial plane or a central main groove extending at a widthwise position away in the tread width direction from the tire equatorial plane by a distance of ≤0.2×a tread width TW, two land portions demarcated by the central main groove and two other main grooves adjacent thereto on respective sides thereof in the tread width direction each represent a central land portion, ii) otherwise than i), a land portion demarcated by the two main grooves closest to the tire equatorial plane represents a central land portion, and iii) each land portion adjacent to the central land portion on the outer side in the tread width direction of the central land portion represents an adjacent land portion, rigidity in the tread circumferential direction of the central land portion is lower than rigidity in the tread circumferential direction of the adjacent land portion;

tread rubber is constituted of two tread rubber layers, and one of the tread rubber layers has smaller elastic modulus than the other tread rubber layer located on the inner side in the tire radial direction of the one rubber layer; and the adjacent land portion has a spew formed in a tire vulcanization process in the tire width direction vicinity of the main groove adjacent on the inner side in the tire width direction of the adjacent land portion, and provided that a distance in the tire width direction between the spew and an end portion, on the inner side in the tire width direction, of the adjacent land portion is D and a rubber gauge of the tread rubber at a tire widthwise position where the spew exists is G, $0.3 \times G \leq D \leq 0.55 \times G$.

In the present specification, "rigidity in the tread circumferential direction" of a land portion is determined by a width in the width direction and a circumferential length of the land portion, a groove depth, and the characteristics of the rubber constituting the land portion and can be obtained by simulation calculations. A "main groove extending in the tread circumferential direction" may represent a main groove extending in a zigzag or curved manner, as well as a main groove extending linearly. The expression of "extending in the tread circumferential direction" may represent not only extending at 0° with respect to the tread circumferential direction but also extending to be inclined at angle of ≤45° with respect to the tread circumferential direction. A "tread width TW" represents the maximum width in the tire width direction of a ground contact surface of a tread when a tire is assembled with a prescribed rim and inflated at the normal internal pressure with the maximum load exerted thereon. In the present disclosure, a "prescribed rim" represents a rim prescribed for each tire size by an industrial standard which is valid in an area where the tire is manufactured and used, and examples of the industrial standard include: "JATMA (The Japan Automobile Tyre Manufacturers Association, Inc.) YEAR BOOK" of Japan; STANDARDS MANUAL" of ETRTO (The European Tyre and Rim Technical Organisation) of Europe; and "TRA (THE TIRE AND RIM ASSOCIATION INC.) Year Book" of the United States. The "normal internal pressure" represents (the maximum) internal air pressure corresponding to the maximum loading capacity prescribed by these industrial standards such as JATMA for a tire of application size assembled with a prescribed rim. "The maximum loading capacity" represents the maximum mass which is permitted to be loaded on a single tire of the application size by these industrial standards such as JATMA.

Further, "elastic modulus" represents a measurement value of reaction force measured when strain (5%) was applied to a rubber sample as sine waves having frequency: 15 Hz at temperature: 50° C. Specifically, elastic modulus can be measured by using a viscoelasticity analyzer manufactured by Rheometric Scientific, Inc., for example. A "rubber gauge" represents thickness in the tire radial direction of the tread rubber. A "rubber gauge" and a "distance in the tire width direction" represent a "rubber gauge" and a "distance in the tire width direction" measured in a tire assembled with a prescribed rim and inflated at the normal internal pressure with no load exerted thereon, respectively.

A "groove width" mentioned below represents an opening width of a main groove measured in a tire assembled with a prescribed rim and inflated at the normal internal pressure with no load exerted thereon. A groove width of a main groove represents the average groove width in the full circumference of the main groove in a case where the groove width is not constant in the extending direction of the main groove.

Further, a foaming rate (Vs) mentioned below can be calculated by the following formula.

$$Vs=(\rho 0/\rho 1-1)\times 100(\%)$$

wherein, in the formula, $\rho 1$ represents density (g/cm$^3$) of tread rubber and $\rho 0$ represents density (g/cm$^3$) of a solid phase of the tread rubber.

According to the present disclosure, a pneumatic tire capable of suppressing partial wear can be provided.

DETAILED DESCRIPTION

Figure 1:
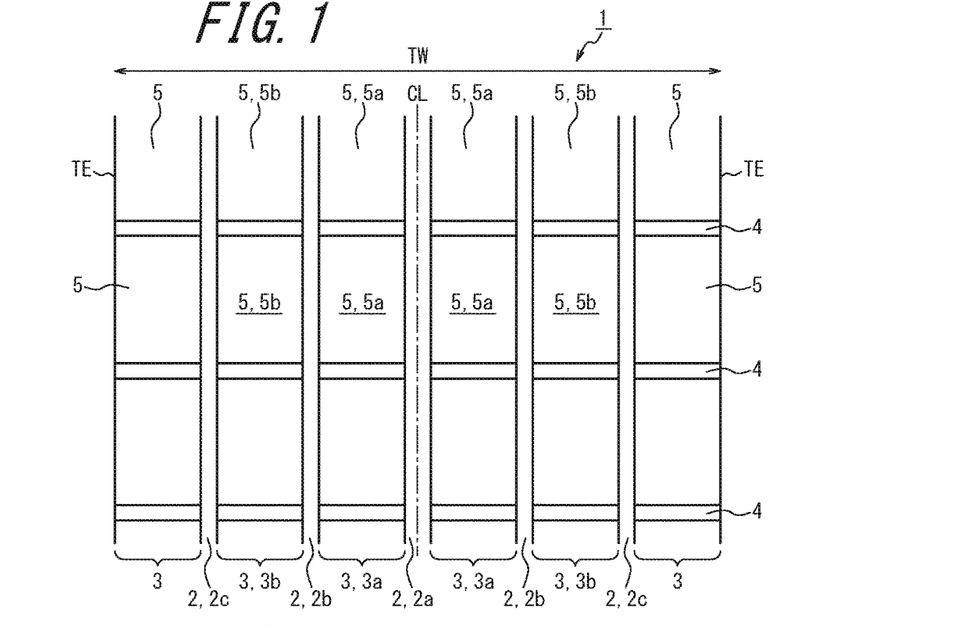
FIG. 1 is a development view showing a ground contact surface of a tread of a tire according to one embodiment of our tire.

A pneumatic tire (which will be referred to simply as a "tire" hereinafter) according to one embodiment of our tire will be demonstratively described in detail hereinafter with reference to the drawings. FIG. 1 is a development view showing a ground contact surface of a tread of a tire according to one embodiment of our tire. As shown in FIG. 1, the tire of the present embodiment has in a ground contact surface 1 of a tread thereof a plurality (six in the example shown in the drawing) of land portions 3 demarcated by a plurality (five in the example shown in the drawing) of main grooves 2 extending in the tread circumferential direction and tread ends TE. The respective land portions 3 are sectioned by lateral grooves 4 extending in the tread width direction, to be demarcated into blocks 5, in an example shown in FIG. 1.

One main groove 2a among the main grooves 2 extending in the tread circumferential direction extends along the tire equatorial plane CL in the example shown in FIG. 1. Two central land portions 3a are demarcated by the circumferential main groove 2a and two adjacent main grooves 2b adjacent on the outer side in the tread width direction to the circumferential main groove 2a. The central land portions 3a are demarcated by the lateral grooves 4 into central blocks 5a.

Further, an adjacent land portion 3b is demarcated by the adjacent main groove 2b and a tread-width-direction outermost main groove 2c corresponding thereto in the example shown in FIG. 1. The adjacent land portions 3b are demarcated by the lateral grooves 4 into adjacent blocks 5b.

Figure 2:
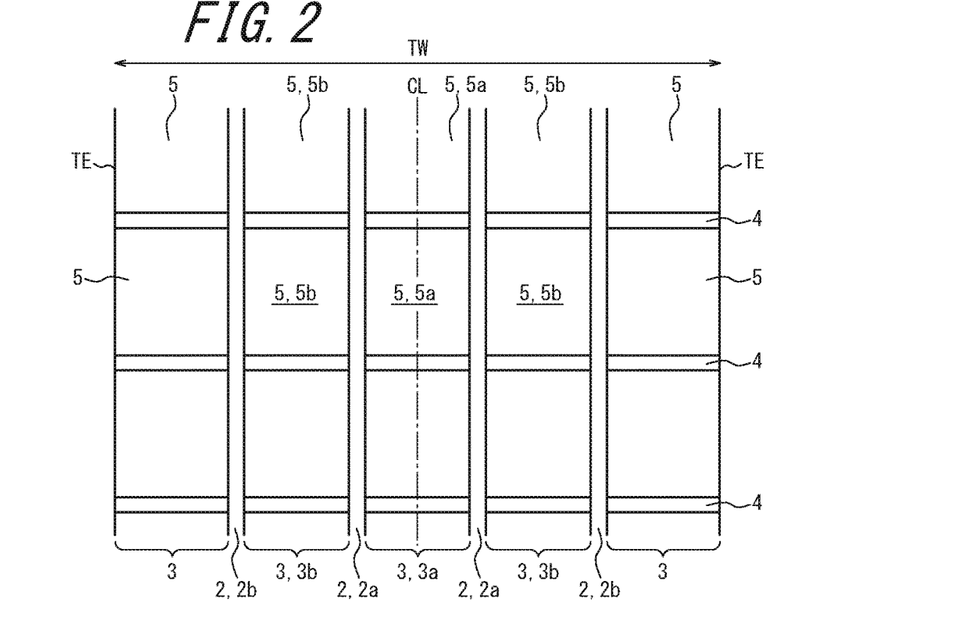
FIG. 2 is a development view showing a ground contact surface of a tread of a tire according to another embodiment of our tire.

FIG. 2 is a development view showing a ground contact surface of a tread of a tire according to another embodiment of our tire. The tire, in an example shown in FIG. 2, has in a ground contact surface 1 of a tread thereof five land portions 3 demarcated by four main grooves 2 extending in the tread circumferential direction and tread ends IL. The two circumferential (central) main grooves 2a closest to the tire equatorial plane CL are each located at a widthwise position away in the tread width direction from the tire equatorial plane CL by a distance of 9-21% of a tread width TW in the example shown in FIG. 2. These two main grooves 2a demarcate a central land portion 3a. The central land portion 3a is demarcated into central blocks 5a by the lateral grooves 4 extending in the tread width direction in the example shown in FIG. 2.

The tire in the example shown in FIG. 2 has an adjacent main groove 2b adjacent on the outer side in the tread width direction of each central main groove 2a, i.e. totally two adjacent main groves 2b. Each central main groove 2a and the adjacent main groove 2b adjacent thereto demarcate an adjacent land portion 3b. The adjacent land portion 3b is demarcated into adjacent blocks 5b by the lateral grooves 4 extending in the tread width direction.

As described in the foregoing two embodiments, it is defined that: i) when the ground contact surface 1 of the tread has a central main groove 2a extending on the tire equatorial plane CL or a central main groove extending at a widthwise position away in the tread width direction from the tire equatorial plane by a distance of ≤0.2×a tread width TW, as shown in FIG. 1, the two land portions demarcated by the central main groove 2a and the two adjacent main grooves 2b adjacent thereto on respective sides thereof in the tread width direction each represent a central land portion 3a; ii) otherwise than i), as shown in FIG. 2, a land portion demarcated by two main grooves 2a closest to the tire equatorial plane CL represents a central land portion 3a; and iii) each land portion adjacent to the central land portion 3a on the outer side in the tread width direction of the central land portion represents an adjacent land portion 3b. In this connection, it is essentially important that rigidity in the tread circumferential direction of the central land portion 3a is lower than rigidity in the tread circumferential direction of the adjacent land portion 3b in our tire. An effect of our tire will be described hereinafter in this regard.

According to our tire, rigidity of the tire center portion of the tread is lower than rigidity of other portions of the tread because rigidity in the tread circumferential direction of the central land portion 3a is lower than rigidity in the tread circumferential direction of the adjacent land portion 3b. As a result, it is possible to decrease wear energy at the tire center portion of the tread and make tire wear even in the tread width direction, thereby successfully suppressing partial wear.

Figure 3:
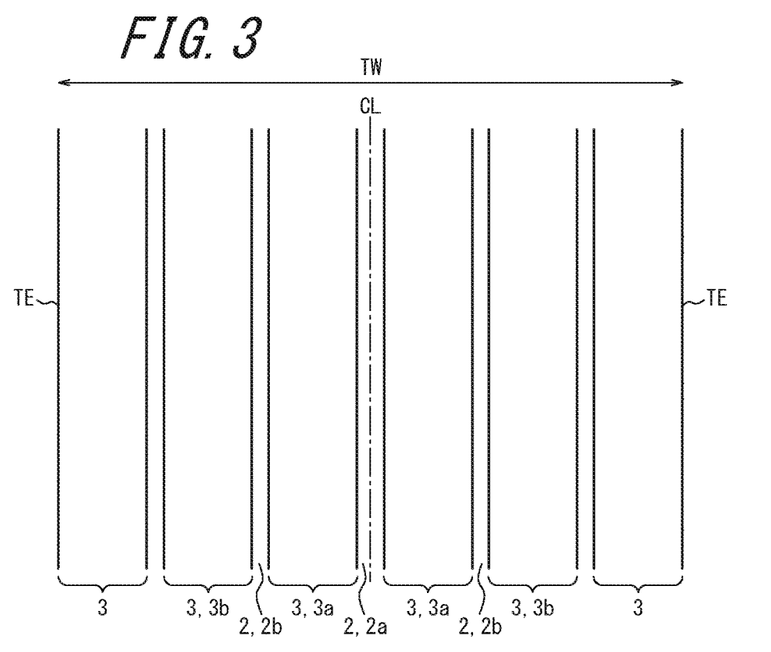
FIG. 3 is a development view showing a ground contact surface of a tread of a tire according to yet another embodiment of our tire.
Figure 4:
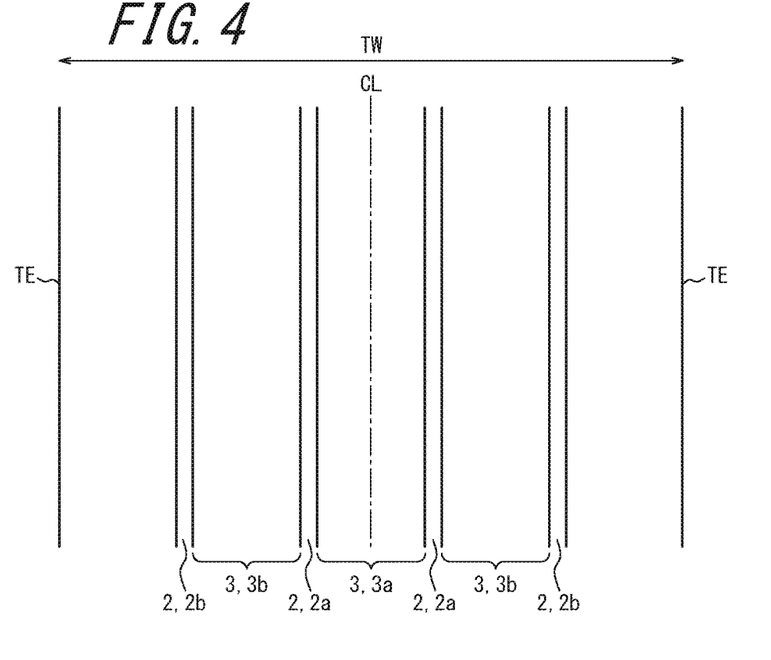
FIG. 4 is a development view showing a ground contact surface of a tread of a tire according to yet another embodiment of our tire.

FIG. 3 and FIG. 4 are development views of treads, each showing a tire according to yet another embodiment of our tire. Examples shown in FIGS. 3 and 4 each show a (not block-based but) rib-based pattern as a tread pattern. Specifically, the tires shown in FIGS. 3 and 4 are different from the tires shown in FIGS. 1 and 2, in that the formers each lack the lateral grooves 4 in the ground contact surface 1 thereof. Partial wear can be suppressed in the cases shown in FIGS. 3 and 4 as in the cases shown in FIGS. 1 and 2 because rigidity in the tread circumferential direction of the central land portion 3a is lower than rigidity in the tread circumferential direction of the adjacent land portion 3b.

Figure 5A:
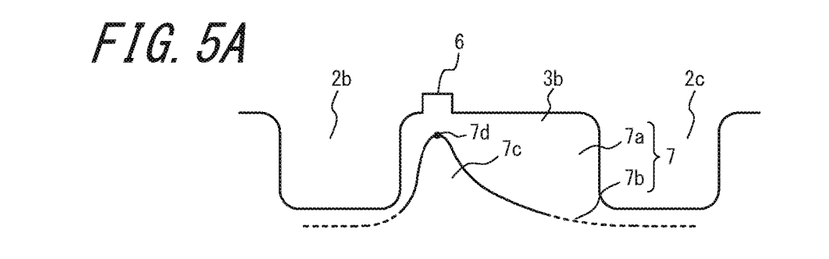
FIG. 5A is a sectional view in the tire width direction, showing a tread portion of a conventional tire.
Figure 5B:
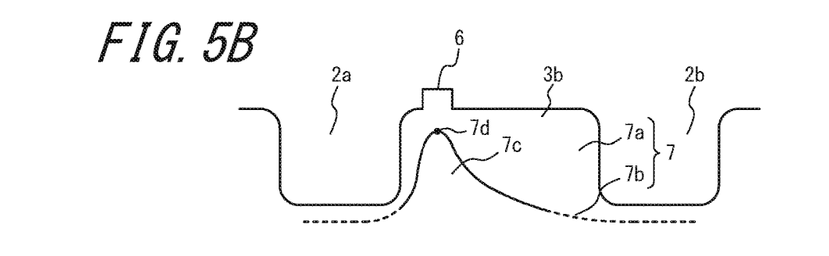
FIG. 5B is a sectional view in the tire width direction, showing a tread portion of another conventional tire.

Next, a specific technique of setting rigidity in the tread circumferential direction of the central land portion 3a to be lower than rigidity in the tread circumferential direction of the adjacent land portion 3b will be demonstratively described. FIGS. 5A and 5B are sectional views each schematically showing a tread portion of a conventional tire. FIG. 5A is a sectional view of a tread portion where the tread has a central main groove 2a extending on the tire equatorial plane CL (as shown in FIG. 1) or a central main groove 2a extending at a widthwise position away in the tread width direction from the tire equatorial plane CL by a distance of ≤0.2×a tread width TW. On the other hand, FIG. 5B is a sectional view of a tread portion where the central main groove 2a extends at a widthwise position beyond the aforementioned range (as shown in FIG. 2). The adjacent land portion 3b is demarcated by the adjacent main groove 2b and the tread-width-direction outermost main groove 2c corresponding thereto in the case shown in FIG. 5A. On the other hand, the adjacent land portion 3b is demarcated by the central main groove 2a and the adjacent main groove 2b corresponding thereto in the case shown in FIG. 5B. These conventional tires each have what is called a cap-and-base structure in which tread rubber 7 is constituted of two tread rubber layers, as shown in FIGS. 5A and 5B. Elastic modulus of cap rubber 7a is lower than elastic modulus of base rubber 7b positioned on the inner side in the tire radial direction of the cap rubber 7a. The adjacent land portion 3b has at a ground contact surface thereof a spew 6 formed in a tire vulcanization process in the vicinity of the main groove adjacent on the inner side in the tire width direction of the adjacent land portion. Specifically, the spew 6 exists in the vicinity of the adjacent main groove 2b in the case shown in FIG. 5A, while the spew 6 exists in the vicinity of the central main groove 2a in the case shown in FIG. 5B. Further, as shown in FIGS. 5A and 5B, the base rubber 7b has a swollen portion 7c swelling in a protruding shape toward the outer side in the tire radial direction and formed because the base rubber 7b was sucked into vent holes of a vulcanization mold in the vulcanization molding process of the tire. As a result, a portion of the adjacent land portion 3b in the vicinity of the main groove adjacent on the inner side in the tire width direction to the adjacent land portion 3b is primarily constituted of the base rubber having relatively high elastic modulus and thus has relatively high rigidity, thereby increasing ground contact pressure at the tire center portion of the tread, in the conventional tires.

Figure 6A:
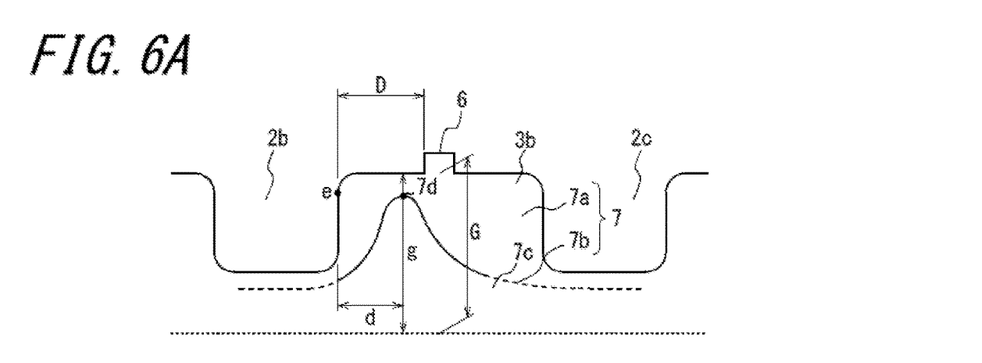
FIG. 6A is a sectional view in the tire width direction, showing a tread portion of a tire according to one embodiment of our tire.
Figure 6B:
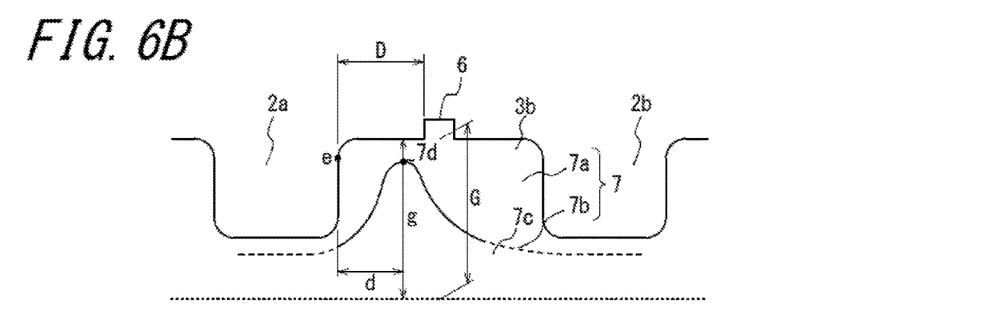
FIG. 6B is a sectional view in the tire width direction, showing a tread portion of a tire according to another embodiment of our tire.

FIGS. 6A and 6B are sectional views each schematically showing a tread portion of our tire. FIG. 6A is a sectional view of the tread portion shown in FIG. 1 and FIG. 6B is a sectional view of the tread portion shown in FIG. 2. It is essentially important with regard to the tire widthwise position of the spew 6 of our tire that, provided that a distance in the tire width direction between the spew 6 and an end portion e, on the inner side in the tire width direction, of the adjacent land portion 3b is D and a rubber gauge of the tread rubber at a tire widthwise position where the spew exists is G, 0.3×G≤D≤0.55×G, as shown in FIGS. 6A and 6B. It is possible to shift the aforementioned swollen portion 7c toward the further inner side of the adjacent land portion 3b and thus relatively decrease rigidity of the tire center portion of the tread and effectively suppress partial wear, as shown in FIGS. 6A and 6B, by setting a ratio D/G to be equal to or higher than 30%. Besides, it is possible to ensure a good air-discharging effect by setting the ratio D/G to be equal to or lower than 55%.

In an actual product, a tire widthwise position where the spew 6 is formed does not coincide with a tire widthwise position where the swollen portion 7c is formed and the position where the swollen portion 7c is formed is located on the inner side in the tire width direction than the position where the spew 6 is formed, as shown in FIGS. 6A and 6B, because the tread rubber is constituted of two rubber layers and the swollen portion 7c is influenced by a flow of the base rubber, as well. Accordingly, with regard to a tire widthwise position of the peak 7d in the tire radial direction of the swollen portion 7c, provided that a distance in the tire width direction between the peak 7d and an end portion e, on the inner side in the tire width direction, of the adjacent land portion 3b is d and a rubber gauge of the tread rubber at the tire widthwise position where the peak 7d in the tire radial direction of the swollen portion 7c exists is g, it is preferably that 0.1×g≤d≤0.30×g for the same setting reasons as described above in connection with D and G.

Further, it is preferable that a ratio of rigidity in the tread circumferential direction of the central land portion 3a with respect to rigidity in the tread circumferential direction of the adjacent land portion 3b is 30% to 70% (inclusive of 30% and 70%). It is possible to adequately decrease rigidity of the tire center portion of the tread and thus suppress partial wear by setting the ratio to be equal to or higher than 30%. It is also possible to ensure good on-snow and on-ice performances essentially required of the tire and suppress occurrence of significant partial wear at tire shoulder portions of the tread due to a too much decrease in rigidity of the tire center portion of the tread, by setting the ratio to be equal to or lower than 70%.

Yet further, it is preferable in our tire that the total sum of groove widths of the main grooves 2 extending in the tread circumferential direction provided across the ground contact surface 1 of the tread is ≥10% and ≤20% of the tread width TW and the groove width of each central main groove is ≥3% and ≤10% of the tread width TW. Setting the total sum of groove widths of the main grooves 2 to be ≥10% of the tread width TW ensures good water drainability and satisfactory anti-hydroplaning performance of the tire and setting the total sum of groove widths of the main grooves 2 to be ≤20% of the tread width TW ensures a satisfactorily large ground contact area of the land portions and thus good on-ice performance of the tire. Setting the groove width of each central main groove to be ≥3% of the tread width TW ensures satisfactory anti-hydroplaning performance of the tire and setting the groove width of the central main groove to be ≤10% of the tread width TW ensures a satisfactorily large ground contact area at the tire center portion of the tread and thus successfully suppresses partial wear at the center portion.

It is preferable in our tire that the main groove 2 having the smallest distance in the tire width direction from the tire equatorial plane CL among the main grooves 2 extending in the tread circumferential direction is provided within a region on each side in the tread width direction of the tire equatorial plane CL ranging from the tire equatorial plane to a tire widthwise position distanced from the tire equatorial plane by ≤10% of the tire width TW. This structure ensures a relatively long ground contact length in the center portion of the tread and thus good anti-hydroplaning performance and good on-ice performance of the tire.

Further, it is preferable in our tire that: the tread rubber is constituted of two tread rubber layers; the tread rubber layer on the outer side in the tire radial direction is made of foamed rubber having an expansion ratio (Vs) in the range of 5%≤Vs≤30%; and a rubber gauge of the tread rubber layer on the outer side in the tire radial direction is ≥10% and ≤50% of a rubber gauge of the tread rubber layer on the inner side in the tire radial direction. Setting the expansion ratio of the cap rubber to be ≥5% ensures good on-ice performance and setting the expansion ratio of the cap rubber to be ≤30% ensures good wear resistance of the tire. Setting the rubber gauge of the cap rubber to be ≥10% of the rubber gauge of the base rubber ensures good on-ice performance when the tire has been worn and setting the rubber gauge of the cap rubber to be ≤50% of the rubber gauge of the base rubber enhances rigidity of the tread and thus ensures good dry performance and satisfactorily high wear resistance of the tire.

It is preferable that the land portions 3 are demarcated into blocks by the lateral grooves 4 extending in the tread width direction, so that good on-snow and on-ice performances required of a tire can be ensured.

Further, it is preferable in our tire that, provided a radius of curvature of the ground contact surface of the tread on the tire equatorial plane CL is R1 and a radius of curvature of the same ground contact surface of the tread at a shoulder portion is R2 in a state where the tire has been assembled with a prescribed rim and inflated at the normal internal pressure with no load exerted thereon, a ratio of R1/R2 is preferably in the range of 1≤R1/R2≤6. Setting the ratio R1/R2 to be within this range ensures preferable ground contact pressure at the tire center portion of the tread. In this connection, the land portions 3 shown in FIGS. 1 and 2 each represent the "shoulder portion" of the tread.

Our tire is not restricted by the demonstrative embodiments thereof described above and may be modified in various manners. For example, the land portions (blocks) may be provided with sipes (e.g. sipes extending in the tread width direction) in the patterns shown in FIGS. 1 to 4.

EXAMPLES

Test tires for Examples 1-19 were prepared in order to confirm effects of our tire. Test tires for Conventional Examples were also prepared. Relevant characteristics of these test tires were shown in Table 1. Each test tire has a what is called cap-and-base structure. Elastic modulus of base rubber is three times as large as elastic modulus of cap rubber in each of the test tires. Further, the total sum of groove widths of the main grooves is 15% of the tread width TW and the groove width of each central main groove is 5% of the tread width TW in each of the test tires.

Each of the test tires, having tire size: 195/65R15 and tread width TW: 160 mm, was subjected to the following tests for evaluating partial wear resistance thereof.

<Partial Wear Resistance>

Each test tire was assembled with a prescribed rim and inflated at the normal internal pressure with load corresponding to two passengers exerted thereon. A wear amount "A" at a position in the vicinity of the central main groove after 10,000 km running and a wear amount "B" at a position on the opposite side of the adjacent land portion in the vicinity of the main groove corresponding thereto were determined, respectively, to calculate a ratio A/B. The evaluation results are shown in Table 1 below.

TABLE 1

| | Tread pattern | Tread portion | Rigidity of central land portion/rigidity of adjacent land portion | Ratio D/G | Ratio d/g | Ratio AB |
|---|---|---|---|---|---|---|
| Example 1 | FIG. 1 | FIG. 6A | 0.25 | 0.15 | 0.1 | 0.9 |
| Example 2 | FIG. 1 | FIG. 6A | 0.3 | 0.3 | 0.2 | 0.88 |
| Example 3 | FIG. 1 | FIG. 6A | 0.5 | 0.42 | 0.33 | 0.82 |
| Example 4 | FIG. 1 | FIG. 6A | 0.7 | 0.55 | 0.36 | 0.76 |
| Example 5 | FIG. 1 | FIG. 6A | 0.75 | 0.58 | 0.39 | 0.75 |
| Example 6 | FIG. 2 | FIG. 6B | 0.25 | 0.15 | 0.1 | 0.94 |
| Example 7 | FIG. 2 | FIG. 6B | 0.3 | 0.3 | 0.2 | 0.92 |
| Example 8 | FIG. 2 | FIG. 6B | 0.5 | 0.42 | 0.33 | 0.86 |
| Example 9 | FIG. 2 | FIG. 6B | 0.7 | 0.55 | 0.36 | 0.8 |
| Example 10 | FIG. 2 | FIG. 6B | 0.75 | 0.58 | 0.39 | 0.79 |
| Example 11 | FIG. 3 | FIG. 6A | 0.5 | 0.42 | 0.33 | 0.82 |
| Example 12 | FIG. 4 | FIG. 6B | 0.5 | 0.42 | 0.33 | 0.86 |

TABLE 1-continued

| | Tread pattern | Tread portion | Rigidity of central land portion/rigidity of adjacent land portion | Ratio D/G | Ratio d/g | Ratio AB |
|---|---|---|---|---|---|---|
| Conventional Example 1 | Same as FIG. 1 | FIG. 5A | 1.1 | 0.92 | 0.61 | 0.57 |
| Conventional Example 2 | Same as FIG. 2 | FIG. 5B | 1.1 | 0.92 | 0.61 | 0.61 |
| Conventional Example 3 | Same as FIG. 3 | FIG. 5A | 1.1 | 0.92 | 0.61 | 0.57 |
| Conventional Example 4 | Same as FIG. 4 | FIG. 5B | 1.1 | 0.92 | 0.61 | 0.61 |

It is understood from Table 1 that the test tires of Examples 1-12 can unanimously suppress partial wear better than the test tires of Conventional Examples.

Next, how a change in groove widths of the main grooves affects tire performance was evaluated by using test tires based on the test tire of Example 2.

<Drainage Properties>

Each of the relevant test tires was assembled with a prescribed rim and inflated at the normal internal pressure with load corresponding to two passengers exerted thereon. The speed at which a hydroplaning phenomenon occurred was determined for the test tire. The evaluation results are shown in Table 2. The evaluation results are shown as indices relative to "100" of the evaluation result of Example 13.

TABLE 2

| | Total sum of groove widths of main grooves//TW | Groove width of central main groove/TW | Drainage properties |
|---|---|---|---|
| Example 13 | 8 | 2 | 100 |
| Example 14 | 10 | 3 | 101 |
| Example 15 | 15 | 5 | 103 |
| Example 16 | 20 | 10 | 106 |
| Example 17 | 22 | 13 | 108 |

It is understood from Table 2 that Examples 14-16 each having groove widths of the main grooves fully within the optimum ranges exhibit better drainage properties than Examples 13 and 17 fully beyond the optimum ranges.

Next, for the main groove having the smallest distance in the tire width direction measured from the tire equatorial plane CL among the main grooves, how a change in the smallest distance affects drainage properties of the tire was evaluated. Drainage properties of the relevant test tires of Examples 18 and 19 were evaluated in the same evaluation method in Examples 13-17.

The relevant characteristics and evaluation results of the test tires of Examples 18 and 19 are shown in Table 3 below.

TABLE 3

| | Smallest distance from the tire equatorial plane/TW | Drainage properties |
|---|---|---|
| Example 18 | 10% | 100 |
| Example 19 | 12% | 100 |

REFERENCE SIGNS LIST

1 Ground contact surface of tread
2 Main groove in tread circumferential direction
2a Central main groove
2b Adjacent main groove
3 Land portion
3a Central land portion
3b Adjacent land portion
4 Lateral groove
5 Block
5a Central block
5b Adjacent block
6 Spew
7 Tread rubber
7a Cap rubber
7b Base rubber
7c Swollen portion
7d Peak
8 Sipe
CL Tire equatorial plane
TE Tread end
TW Tread width
G Rubber gauge
g Rubber gauge
D Distance in tire width direction between spew and tire-width-direction inner side end of adjacent land portion
d Distance in tire width direction between peak and tire-width-direction inner side end of adjacent land portion

The invention claimed is:

1. A pneumatic tire, having in a ground contact surface of a tread a plurality of main grooves extending in the tread circumferential direction and a plurality of land portions demarcated by the main grooves and tread ends, wherein:

provided that i) when the ground contact surface of the tread has a central main groove extending on the tire equatorial plane or a central main groove extending at a widthwise position away in the tread width direction from the tire equatorial plane by a distance of ≤0.2×a tread width TW, two land portions demarcated by the central main groove and two other main grooves adjacent thereto on respective sides thereof in the tread width direction each represent a central land portion, ii) otherwise than i), a land portion demarcated by the two main grooves closest to the tire equatorial plane represents a central land portion, and iii) a land portion adjacent to the central land portion on the outer side in the tread width direction of the central land portion represents an adjacent land portion, rigidity in the tread circumferential direction of the central land portion is lower than rigidity in the tread circumferential direction of the adjacent land portion;

tread rubber is constituted of two tread rubber layers, and one of the tread rubber layers has smaller elastic modulus than the other tread rubber layer located on the inner side in the tire radial direction of the one rubber layer; and the adjacent land portion has a spew formed in a tire vulcanization process in a tire width direction vicinity of the main groove adjacent on the inner side in the tire width direction of the adjacent land portion, and provided that a distance in the tire width direction between the spew and an end portion, on the inner side in the tire width direction, of the adjacent land portion is D and a rubber gauge of the tread rubber at a tire widthwise position where the spew exists is G, a first expression 0.3×G≤D≤0.55×G is satisfied, wherein the only spew or spews that exist on the adjacent land portion satisfy the first expression.

2. The pneumatic tire of claim 1, wherein a ratio of rigidity in the tread circumferential direction of the central land portion with respect to rigidity in the tread circumferential direction of the adjacent land portion is 30% to 70% (inclusive of 30% and 70%).

3. The pneumatic tire of claim 1, wherein a total sum of groove widths of the main grooves extending in the tread circumferential direction provided across the ground contact surface of the tread is ≥10% and ≤20% of the tread width TW and a groove width of each central main groove is ≥3% and ≤10% of the tread width TW.

4. The pneumatic tire of claim 1, wherein the main groove having the smallest distance in the tire width direction from the tire equatorial plane among the main grooves extending in the tread circumferential direction is provided within a region on each side in the tread width direction of the tire equatorial plane CL ranging from the tire equatorial plane to a tire widthwise position distanced from the tire equatorial plane by ≤10% of the tire width TW.

5. The pneumatic tire of claim 1, wherein: the tread rubber is constituted of two tread rubber layers, the tread rubber layer on the outer side in the tire radial direction is made of foamed rubber having an expansion ratio (Vs) in a range of 3%≤Vs≤32%; and a rubber gauge of the tread rubber layer on the outer side in the tire radial direction is ≥10% and ≤50% of a rubber gauge of the tread rubber layer on the inner side in the tire radial direction.

6. The pneumatic tire of claim 1, wherein the land portions are demarcated into blocks by lateral grooves extending in the tread width direction.

7. The pneumatic tire of claim 1, wherein:
the other tread rubber layer has a swollen portion formed in a vulcanization molding process of the tire to swell in a protruding shape toward the outer side in the tire radial direction; and
with regard to a tire widthwise position of a peak in the tire radial direction of the swollen portion, provided that a distance in the tire width direction between the peak and an end portion, on the inner side in the tire width direction, of the adjacent land portion is d, and a rubber gauge of the tread rubber at the tire widthwise position where the peak in the tire radial direction of the swollen portion exists is g, a second expression 0.1×g≤d≤0.30×g is satisfied.

8. The pneumatic tire of claim 7, wherein the only swollen portion or swollen portions that exist in the adjacent land portion and the other tread rubber layer satisfy the second expression.

9. The pneumatic tire of claim 7, wherein the peak of the the swollen portion in the adjacent land portion is inwardly located with respect to the spew in the tire width direction.

* * * * *